/ Patented Sept. 7, 1948

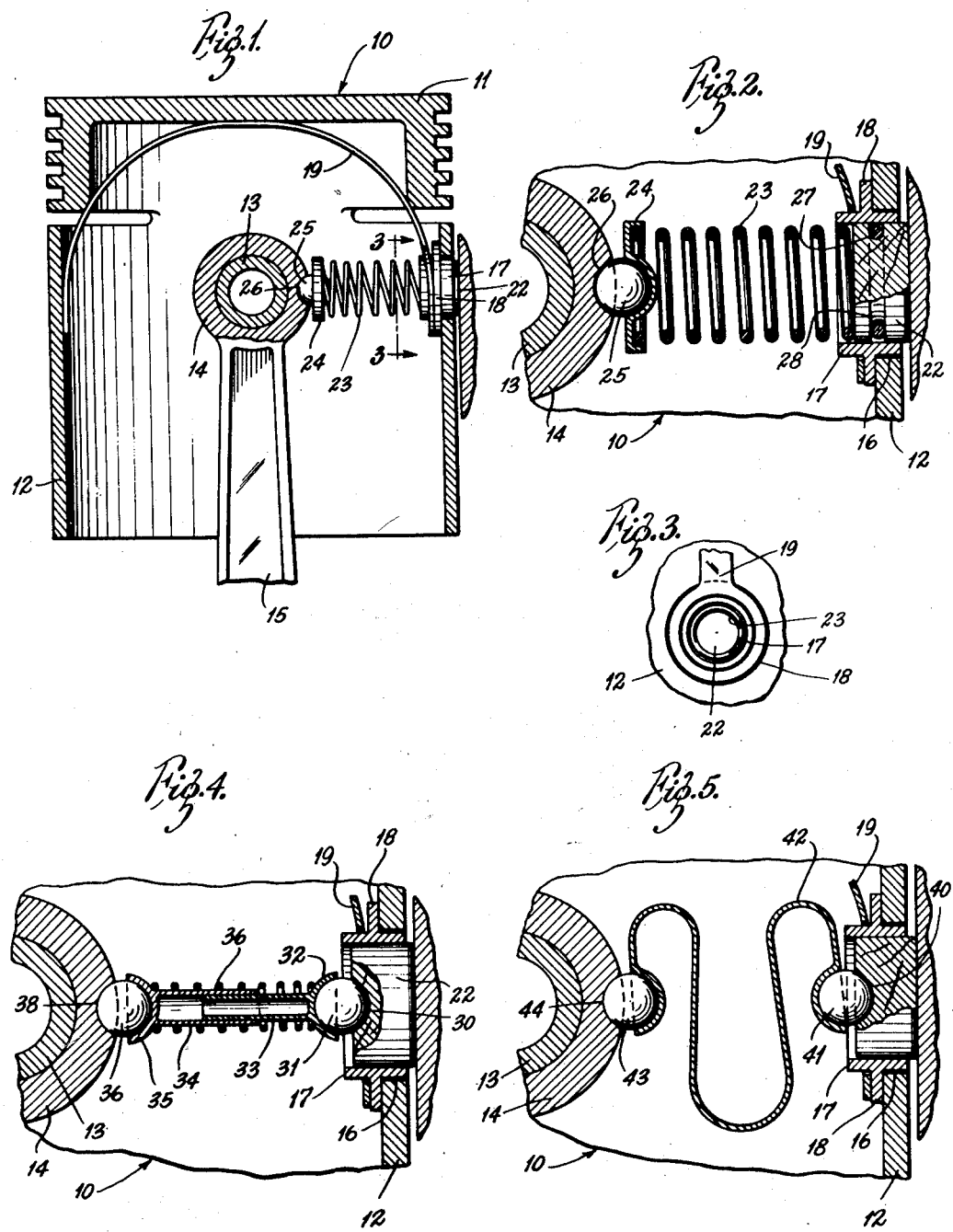

2,448,932

UNITED STATES PATENT OFFICE 2,448,932

PISTON DEVICE

Charles M. Thomas, St. Louis, Mo.

Application May 5, 1945, Serial No. 592,121

14 Claims. (Cl. 309—5)

1

The present invention relates to a combination piston and wrist pin bearing take-up device. More particularly, it relates to a device that will take up the "piston slap" caused by excessive wear in pistons in internal combustion engines and, at the same time, will take up the wear in the wrist pin bearings.

It is an object of the invention to accomplish both of the foregoing ends by a single mechanism. More particularly, it is an object to provide a simple mechanism for the above purposes which can be readily installed and readily replaced and yet which is sure in its operation and durable.

Further objects include the provision of a mechanism of the foregoing kind that is capable of use on pistons of relatively large bore.

In the drawings:

Fig. 1 is a medial vertical cross section through a piston and connecting rod wrist pin bearing with one form of the invention shown in place;

Fig. 2 is an enlarged sectional view of the invention itself similar to its appearance in Fig. 1;

Fig. 3 is a vertical section taken on the line 3—3 of Fig. 1;

Fig. 4 is a view similar to Fig. 2 showing a modification of the invention; and

Fig. 5 is a view similar to Fig. 2 showing a second modification of the invention.

Referring more particularly to Figs. 1 to 3, a piston 10 is shown as representing a conventional piston as used in internal combustion engines. It has a head 11 and a skirt portion 12. It is adapted to support a wrist pin 13 which is engaged by a conventional connecting rod head 14 on a connecting rod 15. It is understood that the connecting rod is connected to the crank shaft at its lower end, which is not shown.

It is well known that, after long use, pistons wear until they are slightly smaller than the cylinders in which they operate. In similar manner, wrist pin bearings wear. The results of these two forms of wear are the so-called "piston slap" and the wrist pin knock, familiar to all operators of motors that have been worn.

It has been heretofore proposed to provide means that tend to take up the piston slack by expanding means that project from the sides of the piston skirts or other like devices. The present invention goes beyond these devices in adding means that, at the same time, take up the wrist pin bearing knock.

The invention itself comprises a member adapted to project through the piston skirt wall and engage the cylinder wall with resilient means urging it outwardly, this resilient means being

2 likewise engaged with the piston head adjacent the wrist pin so that it applies a force thereto.

To this end, the piston wall is provided with an opening 16 therethrough in which is inserted a flanged sleeve 17 having a flange 18 that rests against the inner surface of the piston wall. The outer end of the sleeve member extends no further than the piston surface. The flange 18 is duly shaped to conform to the inner configuration of the inner piston wall against which it abuts. The sleeve 17 is held in place by a more or less semi-circular leaf spring 19 that extends from the flange up under the piston head 11 and around to the side of the piston wall opposite the opening 16. It has an enlarged end with a hole through which the flange 18 of the sleeve 17 is passed. It will be seen that, by this arrangement, the sleeve 17 is strongly but removably urged into position within the opening 16 of the piston wall.

The sleeve 17 receives a wear block or plug 22, usually formed of wood or the like. This plug is closely fitted within the interior of the sleeve so that it can slide inwardly and outwardly relative to the piston. The plug is not as long, radially of the piston, as is the sleeve 17, so that a pocket space is formed back of it. The plug is urged in an outward direction by a coil spring 23 that is supported in the aforementioned pocket back of the plug 22, and, at its other end, it is supported in a collar 24 that is cupped out to provide a spring-receiving flange. This member 24 is generally hemispherically shaped at its central portion to engage a part of a bearing ball 25 that also is seated in a similarly shaped cut-out portion 26 within the head of the piston rod opposite the opening 16 of the piston skirt when the connecting rod 15 is vertical. The two spherical portions that receive the ball 25 are not complete hemispheres, so that the angular movement of the piston rod as the crank shaft rotates is permitted.

Occasionally blocks, such as at 22, may break in service, rendering the device useless, by jamming of the broken parts within the sleeve 17. To prevent this, a snap spring 27 formed of a looped wire is inserted in a groove 28 around the block 22, exerting a binding force to prevent splitting. The groove is so arranged that the spring does not contact with metal anywhere.

In Fig. 4 is shown a slight modification designed for particular use with pistons of extra large bore. The opening 16 through the piston wall, the sleeve 17 with its flange 18, and the spring 19, are all the same as before. In this modification, the block 22 is provided with a cut-out 30 that is a portion of a sphere so that it may receive a ball 31, that, in turn, is received in a cup-like end 32 of a telescoping member 33, the shaft of which interfits with a corresponding telescoping member 34 having a cup-shaped end 35. The two telescoping parts 33 and 34 are separable so that a coil spring 36 may be mounted exteriorly of them to be compressed between their two heads. It will be seen that this coil spring 36 urges the two heads apart. The cup 35 receives a ball 36 corresponding to the ball 24 of the first modification. This ball 36 is likewise received in a cut-out 38 that is shaped to the portion of a sphere.

In Fig. 5, there is shown a somewhat different type of device for the same purpose. In this figure, the opening 16 is provided with the flanged sleeve member 17 as before, it being held in place by the leaf spring 19. Also the block 22 is as before, it having, in this case, an indention 40 in the shape of a portion of a sphere and adapted to receive a ball 41. The ball 41 is held in place by a leaf spring 42, the other end of which likewise engages a ball 43 supported in a spherically shaped cut-out 44 within the head 14 of the connecting rod. The ends of the spring 42 have cup-shaped portions on them in which the two balls seat. The spring is provided with the double loops, as shown, to give it a full resiliency and full length for proper expansion as the piston operates, without undue vertical length.

Operation

After motors have been operated a length of time that causes wear between the piston and cylinder walls, the pistons are subject to the so-called piston slap, which is relative movement of the piston within the cylinder, other than the proper coaxial movement. Also, the connecting rod head 14 oscillates about the wrist pin, owing to the fact that the lower end of the connecting rod is rotated by the crank shaft. This oscillation causes wear in these bearings which results in a certain type of knock in the motor.

The present invention, in each of its forms, is designed to overcome both of these knocks at one time. To this end, it applies a force that urges the piston over against one side of the cylinder, so as to maintain a firm engagement therewith throughout the stroke, and also urges the connecting rod head in one direction against the wrist pin bearing to maintain a close contact therewith throughout the stroke.

The spring 23 acts between the connecting rod head 14 and the block 22 which is in engagement with the cylinder wall. The block is made of relatively soft material so that it will wear and will not score the cylinder walls. It is, of course, readily replaced should it wear out, although, in normal operation, this does not occur during the life of the motor. The compression of the spring acting against the ball 25, in Figs. 1 and 2, which is seated within the connecting rod head 14, urges the connecting rod head to the left in the drawings. This force first takes up any play or looseness in the bearing between the connecting rod head 14 and the wrist pin 13 by urging the connecting rod head thus leftward. As the load on the wrist pin is reversed from pushing to pulling, the spring force causes the right side of the journal in the head 14 to roll down the right side of the wrist pin, where any wear is present.

The spring force is also transmitted by the wrist pin to the piston and urges the piston to the left, so that it bears snugly against the left side of the cylinder wall and thereby is prevented from the rocking movement that causes piston slap.

As the connecting rod head 14 oscillates, the spring is not always in a direct line between the wrist pin center and the center of the block 22. This oscillation, however, is accommodated by the movement of the ball 25 within its socket 26 within the connecting rod head 14 and the corresponding socket within the cup member 24. It will be noted that the combination of the two spherical depressions is less than a full sphere, so that the member 24 may rock relative to the connecting rod head 14. In this rocking movement, it keeps the spring 23 substantially in a single straight line straight line position, with only a slight deformation. It is obvious that a ball may be used at each end of the spring, as in Figs. 4 and 5, or that the hemispherical bearing may be incorporated as a part of the spring holding cup. That is to say, the ball may be an integral part of the cup, the head 14, or the block 22.

Where the bore of the cylinder is exceptionally large, it may be desirable to use the type shown in Fig. 4 wherein the two telescoping members 33 and 34 prevent the spring from being urged out of a straight line direction. In this type, the two balls 31 and 36 permit a rocking movement of both ends of the telescoping members 33 and 34 that maintains the spring 36 in a straight line when the head 14 of the piston oscillates. The telescoping members will telescope to accommodate for the varying axial distances between the two balls occasioned by the oscillation of the connecting rod head.

The type in Fig. 5 provides a relatively cheaper construction. The double loops of the spring 42 provide adequate length and adequate resiliency to take care of all variations occasioned by the oscillation of the connecting rod head. Also, they provide a relatively compact spring that is easily contained within the piston.

The device in any of its forms is readily installed in a piston by the simple process of providing the cut-out 16 within the piston wall and providing the proper seat within the connecting rod head that is shaped as a portion of a sphere. It is, of course, understood that other forms of indentation or other rocking connections could be used, at the sacrifice of some degree of flexibility. Then the sleeve member 17 is installed in the opening 16 and secured in position by slipping the loops of the semi-circular spring 19 over it and against the flange 18, with the other end of the semi-circular spring around against the other wall of the piston. The block 22 is inserted in the sleeve, and secured in place by the spring and ball assembly. Thereafter, the device functions automatically for an inefinite period.

What is claimed is:

1. In a device for taking up lost motion in pistons operating within cylinders, a sleeve adapted to be inserted in an opening through the piston wall, projections on the outside of the sleeve for engagement with the inner surface of the piston to delimit outward movement of the sleeve relative to the piston, and a wear block slidably supported within the sleeve, said wear block being of less thickness than the axial length of the sleeve, whereby the sleeve and the wear block form a spring receiving pocket on the inner portion of the device.

2. In a device for taking up lost motion in pistons operating within cylinders, a sleeve adapted to be inserted in an opening through the piston wall, projections on the outside of the sleeve for engagement with the inner surface of the piston to delimit outward movement of the sleeve relative to the piston, and a wear block slidably supported within the sleeve, said wear block being of less thickness than the axial length of the sleeve, whereby the sleeve and the wear block form a spring receiving pocket on the inner portion of the device, and a band spring around the wear block, there being a circumferential groove around the block to receive the spring and contain it inside the periphery of the block.

3. In a device for taking up lost motion in pistons operating within cylinders, a sleeve adapted to be inserted in an opening through the piston wall, projections on the outside of the sleeve for engagement with the inner surface of the piston to delimit outward movement of the sleeve relative to the piston, and a wear block slidably supported within the sleeve, said wear block being of less thickness than the axial length of the sleeve, whereby the sleeve and the wear block form a spring receiving pocket on the inner portion of the device, and spring means engageable with the projecting parts of the sleeve for holding the sleeve in position within the piston.

4. In a mechanism taking up wear in pistons operating within cylinders and driven by a connecting rod, a compression spring, means supporting the compression spring at one end to apply a force against the cylinder wall, means supporting the spring at the other end to apply a force against the connecting rod head, said spring thereby urging the connecting rod in one direction relative to the piston and also urging the piston in one direction relative to the cylinder wall, one of said support means comprising a ball, a socket-like depression on the connnecting rod head to receive said ball to seat the same for rocking movement, and a socket at the end of the spring to support the spring on the ball for rocking movements relative thereto.

5. In a mechanism taking up wear in pistons operating within cylinders and driven by a connecting rod, a compression spring, means supporting the compression spring at one end to apply a force against the cylinder wall, means supporting the spring at the other end to apply a force against the connecting rod head, said spring thereby urging the connecting rod in one direction relative to the piston and also urging the piston in one direction relative to the cylinder wall, one of said support means consisting of a ball, a socket on the connecting rod head to support the ball for rocking movements, and a collar having a socket to receive the ball for rocking movements, said collar being adapted to receive and hold the end of the spring.

6. In a device for taking up wear in pistons operating within the cylinders by connecting rods that oscillate relative to the piston, a wear block adapted for movement in and out of the piston wall while in engagement with the cylinder wall, a spring for urging said block outwardly into engagement with the cylinder wall, a pair of telescoping members urged apart by said spring, means supporting the end of one of said telescoping members against said block, and means supporting the end of the other of said telescoping members against the connecting rod head.

7. In a device for taking up wear in pistons operating within cylinders by connecting rods that oscillate relative to the piston, a wear block adapted for movement in and out of the piston wall while in engagement with the cylinder wall, a spring for urging said block outwardly into engagement with the cylinder wall, a pair of telescoping members urged apart by said spring, means supporting the end of one of said telescoping members against said block, and means supporting the end of the other of said telescoping members against the connecting rod head, each of said last main means consisting of a ball, there being a socket-like seat within the ends of the two telescoping members to provide rocking movement of the telescoping members on the ball, and there being a socket-like seat in both the block and the connecting rod head for also receiving said balls for rocking movement.

8. In a device for taking up wear in connecting rod driven pistons, a sleeve adapted to be inserted in an opening through a piston wall, projections on the outside of the sleeve for engagement with the inner surface of the piston to delimit outward movement of the sleeve relative to the piston, a wear block slidably supported within the sleeve, said wear block being of less thickness than the axial length of the sleeve, whereby the sleeve and the wear block form a pocket opening into the piston, a compression spring having one end extending into the pocket and being disposed against the wear block, a socket in the connecting rod head receiving a ball, and a collar having a socket on one side receiving said ball and having a flange on the other side receiving the other end of said spring, whereby the connecting rod is urged in one direction relative to the piston and the piston is urged in one direction relative to the cylinder wall.

9. In a mechanism taking up wear in pistons operating within cylinders and driven by a connecting rod, a compression spring, means supporting the compression spring at one end to apply a force against the cylinder wall including a sliding wear block having a ball associated therewith, means supporting the spring at the other end to apply a force against the connecting rod head including a ball, said spring thereby urging the connecting rod in one direction relative to the piston and also urging the piston in one direction relative to the cylinder wall, said spring comprising a leaf spring bent to present its two ends at said two supporting means and including a cup-shaped portion at each end adapted to receive the said balls.

10. In a mechanism taking up wear in pistons operating within cylinders and driven by a connecting rod, a compression spring, means supporting the compression spring at one end to apply a force against the cylinder wall including a sliding wear block, means supporting the spring at the other end to apply a force against the connecting rod head including a ball, said spring thereby urging the connecting rod in one direction relative to the piston and also urging the piston in one direction relative to the cylinder wall, said spring comprising a left spring bent to present its two ends at said two supporting means and including a cup-shaped portion at each end adapted to receive the said balls, including a cup-shaped portion at one end cooperating with said ball.

11. In a device for taking up wear in pistons operating within the cylinders by connecting rods that oscillate relative to the piston, a wear block adapted for movement in and out of the piston wall while in engagement with the cylinder wall, a spring for urging said block outwardly into engagement with the cylinder wall, a pair of telescoping members urged apart by said spring, means supporting the end of one of said telescoping members against said block, and means supporting the end of the other of said telescoping members against the connecting rod head including a socket formed in the connecting rod head, a ball, and a socket part formed at the end of the telescoping member.

12. In a device for taking up wear in connecting rod driven pistons, a sleeve adapted to be inserted in an opening through a piston wall, projections on the outside of the sleeve for engagement with the inner surface of the piston to delimit outward movement of the sleeve relative to the piston, a wear block slidably supported within the sleeve, a socket formed in the wear block, a ball within the socket, a pair of telescoping members, a spring urging said telescoping members apart, one of said telescoping members including a socket portion engaging the said ball, and means supporting the other of said telescoping members against the connecting rod head, whereby the connecting rod head is urged away from the piston wall and the piston is urged away from the cylinder wall.

13. In a device for taking up wear in connecting rod driven pistons, a member adapted for engagement with the cylinder wall and movable relative to the main body of the piston, a compression spring adapted to urge said member against the cylinder wall, and means supporting the other end of the spring against the connecting rod head to maintain the spring under compression so that it exerts a force against the cylinder wall and against the connecting rod head, said last means including a socket in the connecting rod head, a ball in the socket, and a collar having a socket on one side engaging said ball and means on the other side providing a support and retainer for said spring.

14. In a mechanism taking up wear in pistons operating within cylinders and driven by a connecting rod, a compression spring, means supporting the compression spring at one end to apply a force against the cylinder wall, means supporting the spring at the other end to apply a force against the connecting rod head, said spring thereby urging the connecting rod in one direction relative to the piston and also urging the piston in one direction relative to the cylinder wall, said first-named supporting means including a wear block and means supporting the wear block within the piston wall for movement in and out of the piston while in engagement with the cylinder wall, said wear block supporting means including a removable sleeve mounted in and extending through the wall of the piston, and means holding said removable sleeve in wear block receiving position.

CHARLES M. THOMAS.

REFERENCES CITED

The following references are of record in the file of this patent:

UNITED STATES PATENTS

| Number | Name | Date |
|---|---|---|
| 1,601,918 | Knight | Oct. 5, 1926 |
| 1,602,797 | Knight | Oct. 12, 1926 |
| 1,750,321 | Knight | Mar. 11, 1930 |
| 2,219,798 | Wherry | Oct. 29, 1940 |
| 2,234,148 | Smith | Mar. 4, 1941 |
| 2,239,257 | Summers | Apr. 22, 1941 |
| 2,252,149 | Wherry | Aug. 12, 1941 |